United States Patent
Quan et al.

(10) Patent No.: US 9,228,471 B2
(45) Date of Patent: Jan. 5, 2016

(54) MIXING DEVICE FOR AN EXHAUST SYSTEM OF A VEHICLE

(71) Applicant: Daimler AG, Stuttgart (DE)

(72) Inventors: Peng Quan, Novi, MI (US); Jeffrey Girbach, Farmington, MI (US)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/160,056

(22) Filed: Jan. 21, 2014

(65) Prior Publication Data

US 2014/0202141 A1  Jul. 24, 2014

(30) Foreign Application Priority Data

Jan. 22, 2013  (GB) .................................. 1301152.3

(51) Int. Cl.
| | |
|---|---|
| *F01N 3/10* | (2006.01) |
| *F01N 3/28* | (2006.01) |
| *B01F 5/04* | (2006.01) |
| *B01F 5/06* | (2006.01) |
| *B01F 3/04* | (2006.01) |
| *B01F 5/00* | (2006.01) |
| *F01N 3/20* | (2006.01) |

(52) U.S. Cl.
CPC .......... *F01N 3/2892* (2013.01); *B01F 3/04049* (2013.01); *B01F 5/045* (2013.01); *B01F 5/0648* (2013.01); *B01F 2005/0025* (2013.01); *F01N 3/2066* (2013.01); *F01N 2240/20* (2013.01); *F01N 2470/18* (2013.01); *F01N 2610/02* (2013.01)

(58) Field of Classification Search
USPC ............ 60/274, 286, 295, 297, 301, 303, 324
See application file for complete search history.

(56) References Cited

U.S. PATENT DOCUMENTS

| | | | |
|---|---|---|---|
| 5,601,792 A * | 2/1997 | Hug et al. ...................... 422/169 |
| 6,401,449 B1 | 6/2002 | Hofmann et al. | |
| 6,444,177 B1 * | 9/2002 | Muller et al. .................. 422/177 |
| 6,722,123 B2 * | 4/2004 | Liu et al. .......................... 60/286 |
| 7,152,396 B2 * | 12/2006 | Cheng .............................. 60/286 |
| 8,033,104 B2 * | 10/2011 | Zhang .............................. 60/295 |
| 8,371,114 B2 * | 2/2013 | Hayashi et al. ................. 60/317 |
| 8,800,276 B2 * | 8/2014 | Levin et al. ...................... 60/324 |
| 2012/0124983 A1 | 5/2012 | Hong | |

FOREIGN PATENT DOCUMENTS

| | | |
|---|---|---|
| EP | 2 224 108 A1 | 9/2010 |
| WO | WO 2009/128885 A1 | 10/2009 |
| WO | WO 2011/133155 A1 | 10/2011 |
| WO | WO 2012/008570 A1 | 1/2012 |
| WO | WO 2013/004769 A1 | 1/2013 |

* cited by examiner

*Primary Examiner* — Binh Q Tran
(74) *Attorney, Agent, or Firm* — Crowell & Moring LLP

(57) ABSTRACT

A mixing device for an exhaust system of a vehicle includes an inlet pipe, through which exhaust gas can enter a mixing chamber of the mixing device, and an outlet pipe for the exhaust gas to leave the mixing chamber. The inlet pipe and the outlet pipe form an angle. The mixing chamber includes an opening for an outlet of a dosage device, by means of which a reducing agent for exhaust gas aftertreatment is introducible into the mixing chamber. A baffle is arranged at a wall of the inlet pipe a baffle, which is induces a turbulence in the exhaust gas flow entering the mixing chamber.

14 Claims, 4 Drawing Sheets

Figure 1:
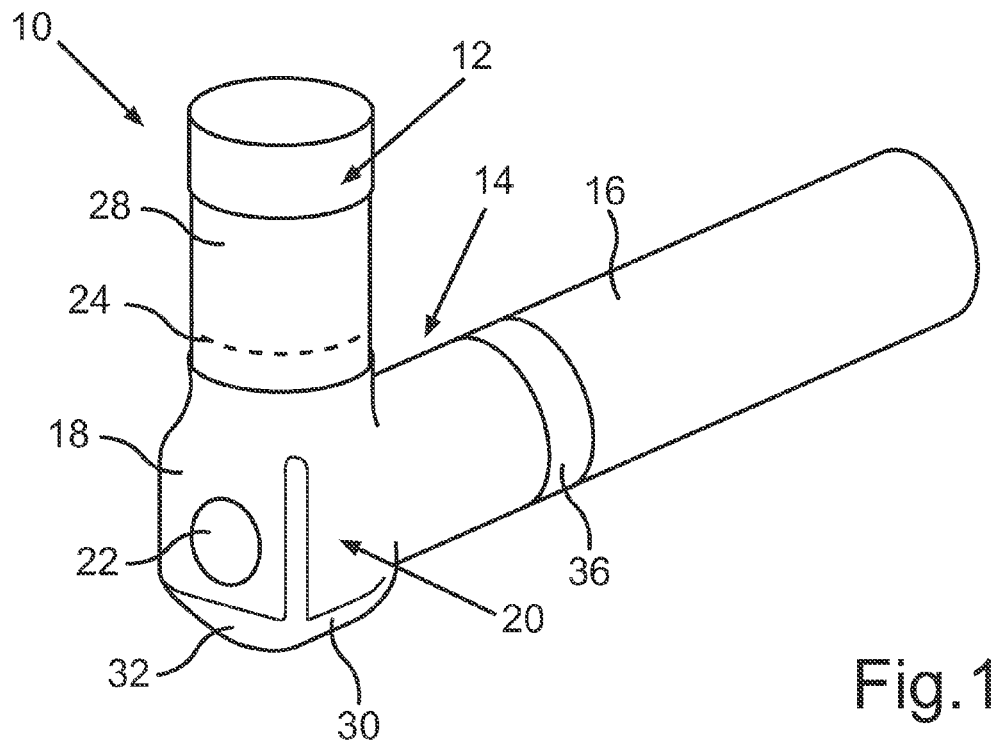

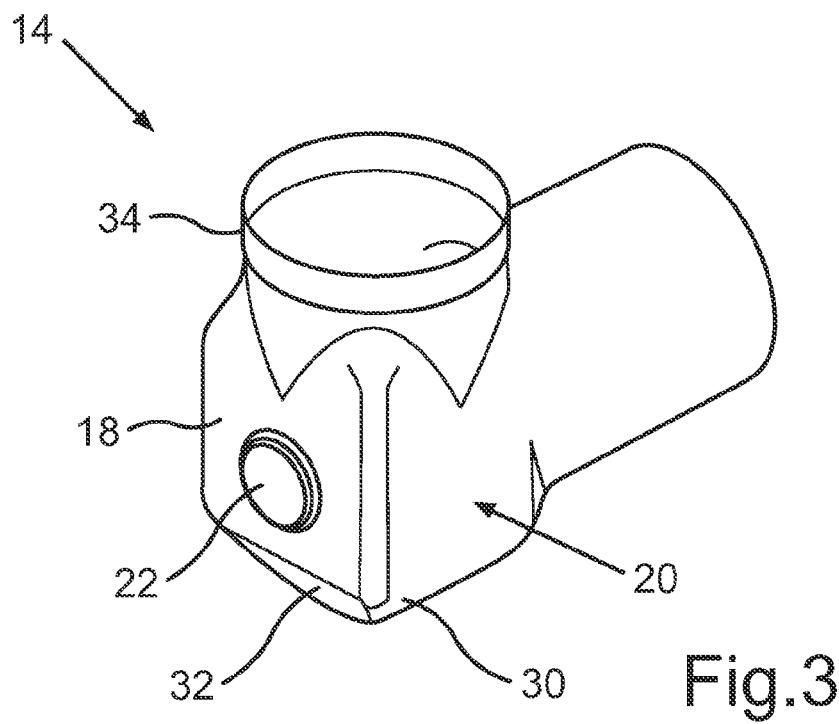
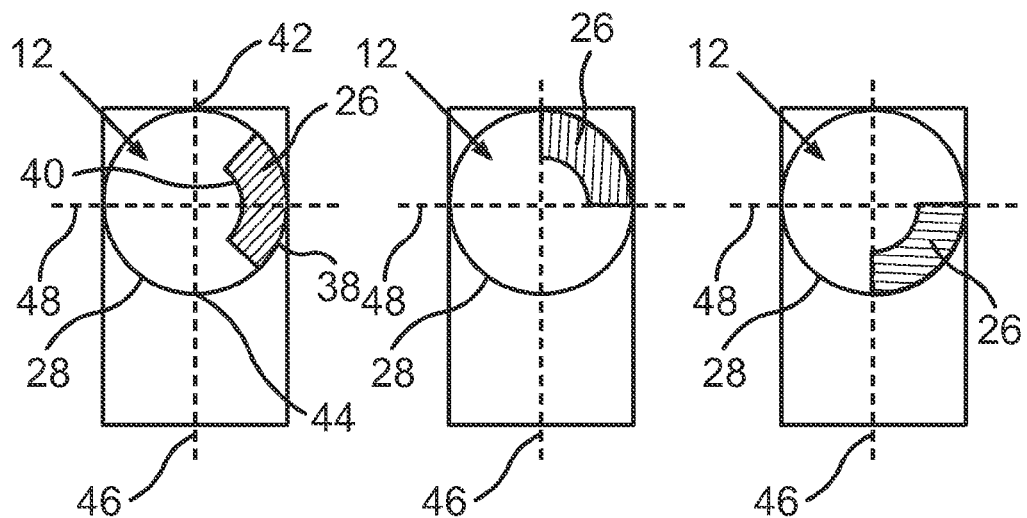

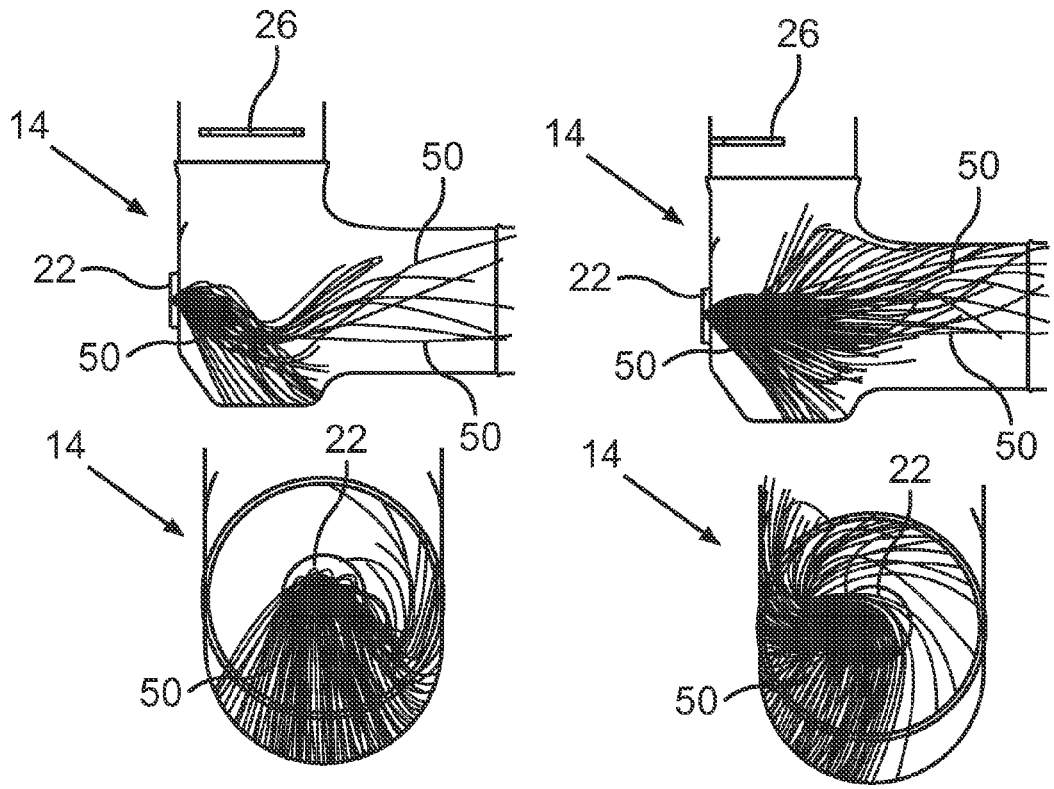
Fig.5
Fig.6
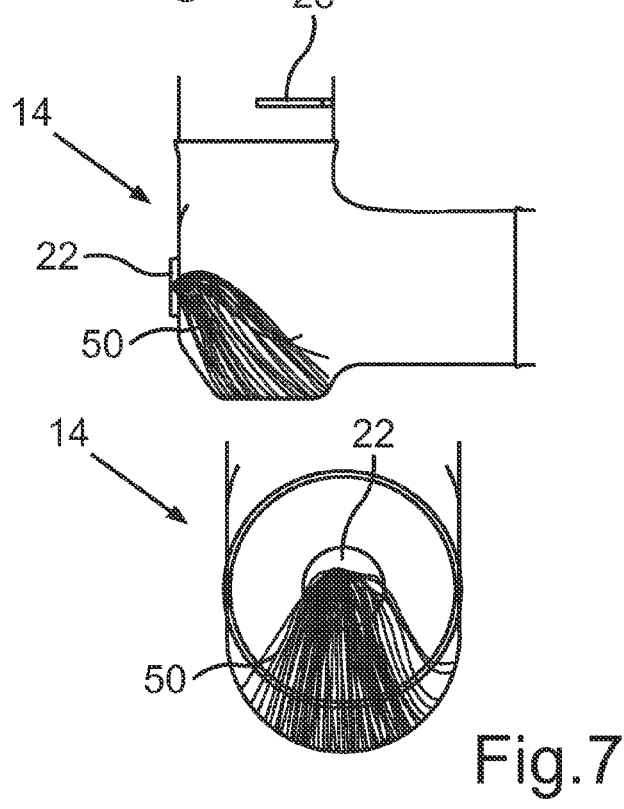
Fig.7

MIXING DEVICE FOR AN EXHAUST SYSTEM OF A VEHICLE

CROSS-REFERENCE TO RELATED APPLICATIONS

The present application claims priority under 35 U.S.C. §119 to UK patent application number 1301152.3, filed on Jan. 22, 2013, the entire disclosure of which is herein expressly incorporated by reference.

BACKGROUND AND SUMMARY OF THE INVENTION

Exemplary embodiments of the present invention relate to a mixing device for an exhaust system of a vehicle. The mixing device comprises an inlet pipe through which exhaust gas can enter a mixing chamber of the mixing device. The exhaust gas can leave the mixing chamber through an outlet pipe of the mixing device. The inlet pipe and the outlet pipe form an angle. The mixing chamber comprises an opening for an outlet of a dosage device, by means of which a reducing agent for exhaust gas aftertreatment is introducible into the mixing chamber.

PCT patent publication WO 2009/128 885 A1 describes a mixing device designed for the fine distribution of a reducing agent for exhaust gas aftertreatment, for example an urea-water solution. A mixing pipe is arranged within a mixing chamber formed by a pipe with a 90° angle. The mixing pipe has an opening adapted to receive a nozzle of a urea dosage device. A funnel-shaped end portion of the mixing pipe bears against a wall of the mixing chamber. The mixing pipe is provided with a multitude of large-area perforations on its circumference, which enable the exhaust gas to enter the mixing pipe. Other perforations in the funnel-shaped end portion of the mixing pipe lead to an exhaust gas flow along the circumference of an outlet pipe connected to the mixing chamber.

One disadvantage of this urea mixing device is that it leads to a considerable backpressure of the exhaust system. Additionally, in case of urea as the reducing agent, an enhanced danger for unwanted deposits may exist.

Extensive mixing of urea with the exhaust gas helps improve the conversion of nitrogen oxides in an SCR catalytic converter (SCR=selective catalytic reduction) arranged downstream of the mixing device in the exhaust system. In the SCR catalytic converter nitrogen oxides (NOx) contained in the exhaust gas react with ammoniac (NH3) released from the urea of the urea containing solution or such a reducing agent. Thus, nitrogen oxides are converted with the ammoniac to nitrogen and water in a selective catalytic reduction reaction. This leads to a decrease of the content of nitrogen oxides in the exhaust gas.

Exemplary embodiments of the present invention provide a mixing device that achieves an enhanced mixing of the reducing agent with the exhaust gas.

The mixing device according to the invention comprises a baffle element. This baffle element is arranged at a wall of the inlet pipe, and it is designed to induce a turbulence in the exhaust gas flow entering the mixing chamber. The baffle element guides the exhaust flow and introduces a turbulence or swirl in the flow field downstream of the baffle element. Therefore, turbulences are already induced at a location of the mixing device, where the reducing agent is injected into the mixing device and the mixing of reducing agent and exhaust gas takes place.

Such a mixing device significantly enhances the mixing of the reducing agent, in particular the mixing of urea with the exhaust gas. With urea as the reducing agent this leads to an improvement of the conversion efficiency regarding nitrogen oxides in an SCR catalytic converter arranged downstream of the mixing device in the exhaust system.

Due to the performance improvement of the mixing device a cost reduction in the operation of the mixing device can be achieved, as less reducing agent needs to be utilized. As the design of the mixing device with the baffle element arranged inside the inlet pipe is very simple, there are low maintenance costs and relatively few parts are incorporated in the mixing device.

Another advantage is the reduction in the chance of a deposit of the reducing agent inside the mixing chamber and downstream of the mixing chamber. This is also due to the open design of a volume of the mixing chamber close to the dosage device. In other words the mixing chamber is empty, i.e. devoid of any elements that would increase backpressure.

The turbulences introduced in the exhaust gas entering the mixing chamber very efficiently avoids the deposit of the reducing agent within the mixing chamber. The mixing device is therefore highly effective and a low cost exhaust gas aftertreatment component.

In an advantageous embodiment of the invention the baffle element is arc-shaped with an outer boundary contacting the wall of the inlet pipe and an inner boundary forming a section of a circular-arc. Such a baffle element has proven to be particularly effective in inducing turbulences in the exhaust gas flow and also guiding the flow direction of exhaust gas in an advantageous manner, while the backpressure is only slightly increased by the baffle element.

It has further proven to be advantageous if the baffle element is contacting the wall of the inlet pipe substantially along a quarter of an inner circumference of the inlet pipe. This leaves a large part of the inner circumference of the inlet pipe free of any flow guiding element, but nevertheless the baffle element is efficient in inducing turbulences.

A first section of the wall of the inlet pipe is located on the same side of the mixing device as the opening in the mixing chamber. A second section of the wall of the inlet pipe is located opposite the first section. Preferably at least a major part of the baffle element is arranged at a portion of the wall of the inlet pipe, which is located between this first section and the second section. In other words the baffle element is preferably arranged at other locations of the inlet pipe than the first section and the second section. However, the baffle element can be arranged in a quadrant of the inlet pipe adjoining an imaginary central plane going through the opening in the mixing chamber and dividing the inlet pipe into two halves. It has been found out that a particularly good distribution of reducing agent in the exhaust gas downstream of the mixing device can be achieved by such arrangements of the baffle element.

In a further advantageous development of the invention a width of the baffle element is less than 25% of a diameter of the inlet pipe. With such a relatively small height of the baffle element the mixing device can achieve particularly good backpressure values. This is particularly true if the width of the baffle element is about 10% of the diameter of the inlet pipe.

It is further advantageous if a portion of the mixing chamber, which is closer to the inlet pipe than to the outlet pipe, is substantially square-shaped. Such a shape of a main part or body part of the mixing chamber allows the exhaust flow to stay relatively long within the mixing chamber and to interact to a very high degree with the reducing agent. This further enhances the mixing of the reducing agent spray with the exhaust gas.

In a further advantageous development of the invention the mixing chamber comprises a bulge in a side wall facing the inlet pipe. This leads to an enhanced formation of turbulences or swirls in the mixing chamber itself and in the outlet pipe connected to the mixing chamber. The uniformity of mixing is largely improvable by this design of the mixing chamber. Also, the flow inertia and the characteristics of the exhaust gas-reducing agent interaction are utilized by this design of the mixing chamber. This bulge or pocket, which is located in a prolongation of the inlet pipe, has proven to be very effective in producing strong swirls in the exhaust gas flow.

During operation of the exhaust system the exhaust gas flow from the inlet pipe is guided by the flat side walls of the mixing chamber to the bulge or pocket at the bottom. The flow thus experiences one or more swirls in a volume close to the bulge before it turns towards the outlet pipe. The strong swirls induced by this design of the mixing chamber are effective even in the outlet pipe. This further enhances the mixing of the reducing agent with the exhaust gas.

A deposit of reducing agent within the bulge can be minimized, if according to a further advantageous development of the invention a portion of the bulge is bevelled, which is adjacent to a wall of the mixing chamber, in which the outlet opening of the dosage device is located.

By the sloped design of this portion of the bulge, which is adjacent to the wall of the mixing chamber with the opening, there is no flow recirculation in this region, which could otherwise lead to a deposit of the reducing agent within the mixing chamber. As such a deposit is critical for the performance of the aftertreatment device, bevelling this portion of the bulge improves the performance.

In order to minimize backpressure and to ease the flow from the inlet pipe into the mixing chamber and from the mixing chamber to the outlet pipe, it has further proven to be advantageous if the inlet pipe and the outlet pipe are smoothly fitted in respective accesses of the mixing chamber. Such blended transitions considerably help reducing backpressure.

For a simplified introduction of the reducing agent into the mixing chamber and a good mixing performance it has further turned out to be advantageous if the inlet pipe and the outlet pipe form an angle of about 90°.

The features and feature combinations mentioned above in the description as well as the features and feature combinations mentioned below in the description of figures and/or shown in the figures alone are usable not only in the respectively specified combination, but also in other combinations or alone without departing from the scope of the invention.

BRIEF DESCRIPTION OF THE DRAWING FIGURES

Figure 2:
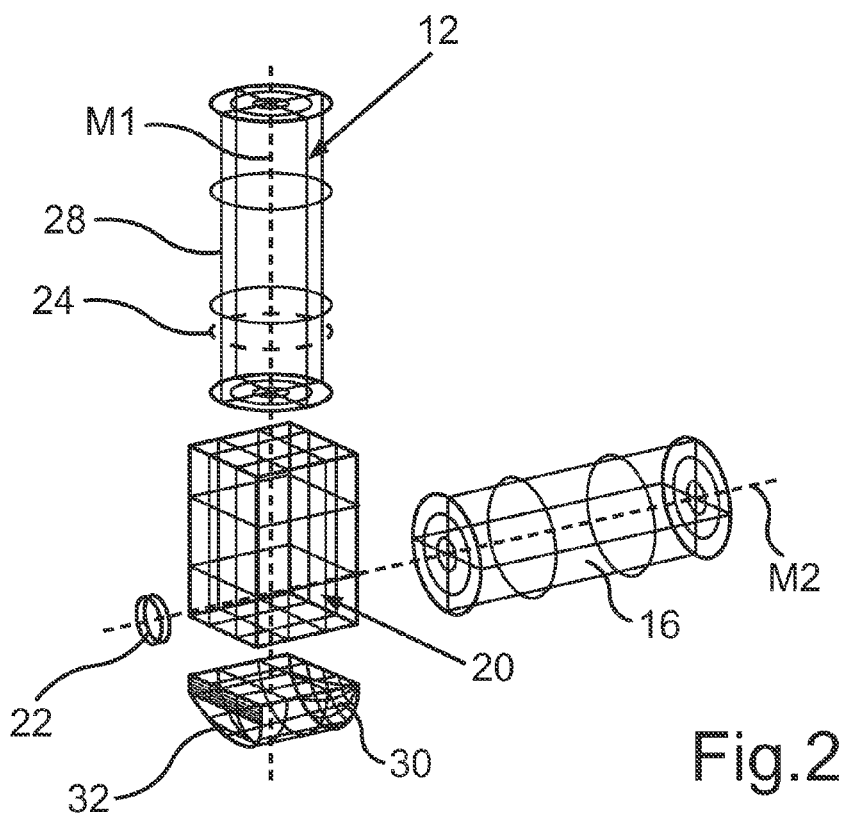
Figure 8:
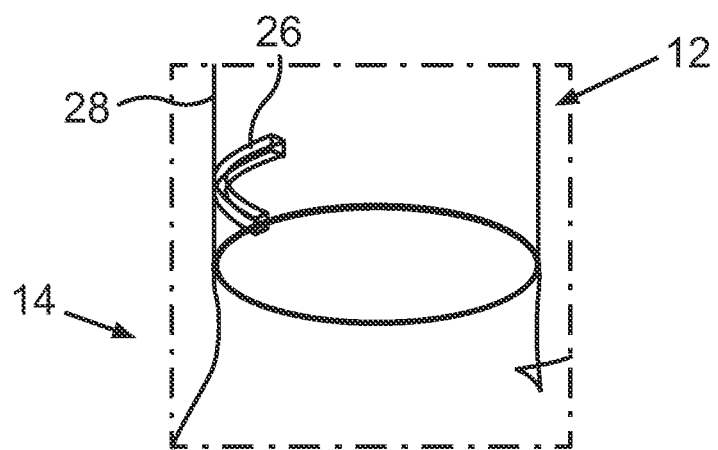

Further advantages, features and details of the invention are apparent from the claims, the following description of preferred embodiments as well as based on the drawings, in which identical or functionally identical elements are provided with identical reference characters. Therein show:

FIG. 1 a urea mixer for an exhaust system of a vehicle, comprising an inlet pipe, a mixing chamber and an outlet pipe, wherein inside the inlet pipe a baffle is arranged;

FIG. 2 a schematic of components of the urea mixer shown in FIG. 1;

FIG. 3 the mixing chamber of the urea mixer shown in FIG. 1 in a perspective view;

FIG. 4 three potential locations of the baffle within the inlet pipe;

FIG. 5 a side sectional view and a front view of parts of the urea mixer with a first arrangement of the baffle inside the inlet pipe according to FIG. 4;

FIG. 6 a side sectional view and a front view of parts of the urea mixer with a second arrangement of the baffle inside the inlet pipe according to FIG. 4;

FIG. 7 a side sectional view and a front view of parts of the urea mixer with a third arrangement of the baffle inside the inlet pipe according to FIG. 4; and FIG. 8 the inlet pipe with a baffle which has a reduced height compared to the baffles shown in FIG. 4.

DETAILED DESCRIPTION

FIG. 1 shows a urea mixer 10 that is part of an exhaust system of a vehicle. The urea mixer 10 comprises an inlet pipe 12 connected to a mixing chamber 14. Through the inlet pipe 12 the exhaust gas enters the mixing chamber 14, and from the mixing chamber 14 the exhaust gas flows to an outlet pipe 16 of the urea mixer 10. The mixing chamber 14 has an elbow-shape. Consequently a center axis M1 of the inlet pipe 12 and a center axis M2 of the outlet pipe 16 form an angle, in particular an angle of about 90° (see FIG. 2).

An opening 22 is arranged in a rear wall 18 of a portion 20 of the mixing chamber 14. This opening 22 is designed to accommodate a nozzle of a dosage device (not illustrated) for introducing liquid urea into the mixing chamber 14. As the rear wall 18 faces the outlet pipe 16, the urea-water solution is injected in the direction of the center axis M2 of the outlet pipe 16 upon entering the mixing chamber 14.

A line 24 in FIG. 1 marks a location inside the inlet pipe 12 where a baffle 26 (see FIG. 4) is arranged at a wall 28 of the inlet pipe 12. This baffle 26 leads to the formation of turbulences or swirls in the exhaust gas flow entering the mixing chamber 14.

As is apparent in particular from the schematic illustration of components of the urea mixer 10 shown in FIG. 2, the portion 20 of the mixing chamber 14 that is closer to the inlet pipe 12 than to the outlet pipe 16 is substantially square-shaped or box-shaped. A bottom wall of this box-shaped portion 20 forms a bulge or pocket 30. A corner of this pocket 20 is cut away. In other words, a portion 32 of the pocket 30 adjacent to the rear wall 18 is preferably bevelled. This square-shape of the portion 20 or main body of the mixing chamber 14 together with the pocket 30 having the cut away corner region or slanted portion 32 leads to the formation of further swirls in the exhaust flow out of the inlet pipe 12 when it reaches the pocket 30 at the bottom of the mixing chamber 14. The cut away corner at the portion 32 of the pocket 30 reduces the chance of urea deposit within the mixing chamber 14.

It is particularly apparent from the perspective view of the mixing chamber 14 in FIG. 3 that an access 34 of the mixing chamber 14, which is designed to accommodate the inlet pipe 12, guarantees a smooth fit of the inlet pipe 12 when connected to the mixing chamber 14. Another connecting region 36 of the mixing chamber 14, which serves as an access for fitting the outlet pipe 16 to the mixing chamber 14 is also smoothly blended in order to reduce backpressure (see FIG. 1).

FIG. 4 shows potential locations of the baffle 26 inside the inlet pipe 12, wherein the view direction is along the center axis M1 of the inlet pipe 12. The baffle 26 is arc-shaped with an inner boundary 38 being in contact with the wall 28 of the inlet pipe 12 and an outer boundary 40 forming a section of a circular arc.

In all three alternatives shown in FIG. 4 this arc-shaped baffle 26 contacts the wall 28 of the inlet pipe 12 along a quarter of an inner circumference of the inlet pipe 12. The width of the baffle 26 is about 25% of the diameter of the inlet pipe 12.

In a first example shown in the left part of FIG. 4 this quarter baffle 26 is located in the middle between a first point 42 and a second point 44 located on the wall 28 of the inlet pipe 12. The first point 42 lies on the same side of the urea mixer 10 as the opening 22 in the rear wall 18 of the mixing chamber 14. The second point 44 is located opposite the first point 42.

In other words these two points 42, 44 are located on the intersection of an imaginary plane 46 dividing the inlet pipe 12 into two halves, wherein this plane 46 also goes through the opening 22. In FIG. 4 a second imaginary plane 48 is indicated, which also divides the inlet pipe 12 into two halves and which is perpendicular to first plane 46. In the example shown in the left part of FIG. 4 the baffle 26 is symmetrical with respect to this second plane 48.

In a second example shown in the middle of FIG. 4 the baffle 26 is arranged between the first plane 46 and the second plane 48, but in a quadrant adjacent to the first point 42. In a third example shown in the right part of FIG. 4 the baffle 26 is also arranged between the first plane 46 and the second plane 48 but in the lower right quadrant, i.e. adjacent to the second point 44.

The exact location of this partial baffle 26 or quarter baffle 26 within the inlet pipe 12 depends on the exhaust flow conditions in the inlet pipe 12 and can be determined by computational fluid dynamics (CFD) analysis. CFD analysis is also utilized in order to determine the shape of the mixing chamber 14.

FIG. 5 shows droplet trajectories 50 within the mixing chamber 14 in a case when the baffle 26 is arranged in the inlet pipe 12 as shown in the left part of FIG. 4.

FIG. 6 shows the droplet trajectories 50 when the baffle 26 is arranged as shown in the example represented in the middle of FIG. 4.

FIG. 7 shows the droplet trajectories 50 in a case when the baffle 26 is arranged at the wall 28 of the inlet pipe 12 as presented in the right part of FIG. 4.

All these arrangements of the baffle 26 lead to a good uniformity of distribution of ammoniac in the outlet pipe 16. The exhaust flow produces strong swirls in the region of the pocket 30. Furthermore swirls or turbulences exist as well in the portion 20 of the mixing chamber 14 as in the straight outlet pipe 16.

FIG. 8 shows an example, where the baffle 26 has a width or height of about 10% of the diameter of the inlet pipe 12. This design further reduces backpressure of the urea mixer 10. This baffle 26 with a lower width is arranged at the location of the wall 28 of the inlet pipe 12 as represented in FIG. 6 and in the middle of FIG. 4 respectively.

This design of the urea mixer 10 shows an acceptable backpressure and a very uniform distribution of urea and/or ammoniac within the outlet pipe 16 of the urea mixer 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mixing device for an exhaust system of a vehicle, the mixing device comprising:
   a mixing chamber;
   an inlet pipe coupled to the mixing chamber so that exhaust gas is provided to the mixing chamber;
   an outlet pipe coupled to the mixing chamber so that the exhaust gas leaves the mixing chamber,
   wherein the inlet pipe and the outlet pipe are connected to the mixing chamber at an angle;
   wherein the mixing chamber comprises an opening configured to receive an outlet of a dosage device, by means of which a reducing agent for exhaust gas aftertreatment is introduced into the mixing chamber;
   wherein a baffle element is attached to an inner wall of the inlet pipe, which the baffle element is configured to induce a turbulence in the exhaust gas flow entering the mixing chamber; and
   wherein a portion of the mixing chamber, which is closer to the inlet pipe than to the outlet pipe, is substantially square-shaped.

2. The mixing device according to claim 1, wherein the baffle element is arc-shaped with an outer boundary contacting the inner wall of the inlet pipe and an inner boundary forming a section of a circular arc.

3. The mixing device according to claim 1, wherein the baffle element is contacting the inner wall of the inlet pipe substantially along a quarter of an inner circumference of the inlet pipe.

4. The mixing device according to claim 1, wherein at least a major part of the baffle element is arranged at a portion of the inner wall of the inlet pipe, which is located between a first section of the inner wall, which is located on the same side of the mixing device as the opening in the mixing chamber and a second section of the inner wall, which is located opposite the first section.

5. The mixing device according to claim 1, wherein a width of the baffle element is less than 25% of a diameter of the inlet pipe.

6. The mixing device according to claim 5, wherein the width of the baffle element is 10% of the diameter of the inlet pipe.

7. The mixing device according to claim 1, wherein the mixing chamber comprises a bulge in a side wall facing the inlet pipe.

8. The mixing device according to claim 7, wherein a portion of the bulge, which is adjacent to a wall of the mixing chamber, in which the opening is located, is bevelled.

9. The mixing device according to claim 1, wherein the inlet pipe and the outlet pipe are smoothly fitted in respective accesses of the mixing chamber.

10. A mixing device for an exhaust system of a vehicle, the mixing device comprising:
    a mixing chamber;
    an inlet pipe coupled to the mixing chamber so that exhaust gas is provided to the mixing chamber;
    an outlet pipe coupled to the mixing chamber so that the exhaust gas leaves the mixing chamber,
    wherein the inlet pipe and the outlet pipe are connected to the mixing chamber at an angle;
    wherein the mixing chamber comprises an opening configured to receive an outlet of a dosage device, by means of which a reducing agent for exhaust gas aftertreatment is introduced into the mixing chamber;

wherein a baffle element is arranged at a wall of the inlet pipe, which the baffle element is configured to induce a turbulence in the exhaust gas flow entering the mixing chamber; and wherein a portion of the mixing chamber, which is closer to the inlet pipe than to the outlet pipe, is substantially square-shaped, wherein the inlet pipe and the outlet pipe form an angle of 90°.

11. The mixing device according to claim 1, wherein the mixing device includes only a single baffle element.

12. The mixing device according to claim 1, wherein the opening configured to receive an outlet of a dosage device is arranged along a center axis of the outlet pipe in a direction of the exhaust gas exiting the mixing chamber.

13. The mixing device according to claim 10, wherein the opening configured to receive an outlet of a dosage device is arranged along a center axis of the outlet pipe in a direction of the exhaust gas exiting the mixing chamber.

14. The mixing device according to claim 10, wherein the baffle element is attached to an inner wall of the inlet pipe.

* * * * *